United States Patent
Aigner

(12) 
(10) Patent No.: US 6,488,062 B1
(45) Date of Patent: Dec. 3, 2002

(54) PROTECTIVE HOOD FOR WOOD MILLING MACHINES

(75) Inventor: Georg Aigner, Thannenmais, Reisbach (DE), 94419

(73) Assignee: Georg Aigner, Reisbach (DE)

( * ) Notice: Subject to any disclaimer, the term of this patent is extended or adjusted under 35 U.S.C. 154(b) by 0 days.

(21) Appl. No.: 09/646,085

(22) PCT Filed: Jan. 10, 2000

(86) PCT No.: PCT/EP00/00109

§ 371 (c)(1),
(2), (4) Date: Sep. 8, 2000

(87) PCT Pub. No.: WO00/40365

PCT Pub. Date: Jul. 13, 2000

(30) Foreign Application Priority Data

Jan. 8, 1999 (DE) .......................................... 199 00 430

(51) Int. Cl.⁷ ............................. B27G 19/00; B27C 5/02
(52) U.S. Cl. ................................ 144/251.2; 144/252.1; 144/253.2; 144/253.5; 409/134; 409/137
(58) Field of Search ........................ 451/451; 409/134, 409/137, 175, 181, 182; 144/251.1, 251.2, 252.1, 252.2, 253.2, 253.5; 83/444, 447, 450, 100

(56) References Cited

U.S. PATENT DOCUMENTS

| | | | | |
|---|---|---|---|---|
| 4,735,245 A | * | 4/1988 | Cox | 144/251.1 |
| 5,117,880 A | * | 6/1992 | Kapton et al. | 144/251.1 |
| 5,381,842 A | | 1/1995 | Aigner | 144/251.1 |
| 5,423,359 A | * | 6/1995 | Aigner | 144/251.2 |
| 5,452,752 A | * | 9/1995 | Aigner | 144/253.2 |
| 5,555,921 A | * | 9/1996 | Aigner | 144/251.2 |
| 5,778,952 A | * | 7/1998 | Aigner | 144/252.1 |

FOREIGN PATENT DOCUMENTS

| | | | |
|---|---|---|---|
| DE | 69 27 153 | 12/1969 | |
| DE | 39 03 906 | 6/1989 | B27C/5/02 |
| DE | 39 43 595 | 10/1991 | B27G/3/00 |
| EP | 0 558 692 | 9/1993 | B27G/21/00 |

* cited by examiner

Primary Examiner—W Donald Bray
(74) Attorney, Agent, or Firm—Cohen, Pontani, Lieberman & Pavane

(57) ABSTRACT

Disclosed is a protective hood for a wood-milling machine to cover a milling spindle which projects vertically out of a horizontal machine table. The protective hood is formed of two side walls connected to one another by a cover and a rear wall, and a front, vertically adjustable protective shield. The protective hood has a connection stub for an extraction device and can be attached adjustably to the machine table. A holding member for the removable attachment of a stop plate is releasably attached to each of the two side walls of the protective hood. In this way, the protective hood is permanently available as a basic element, so that when changing from curved milling to milling against a stop, it is easy to fit the stop plates.

36 Claims, 16 Drawing Sheets

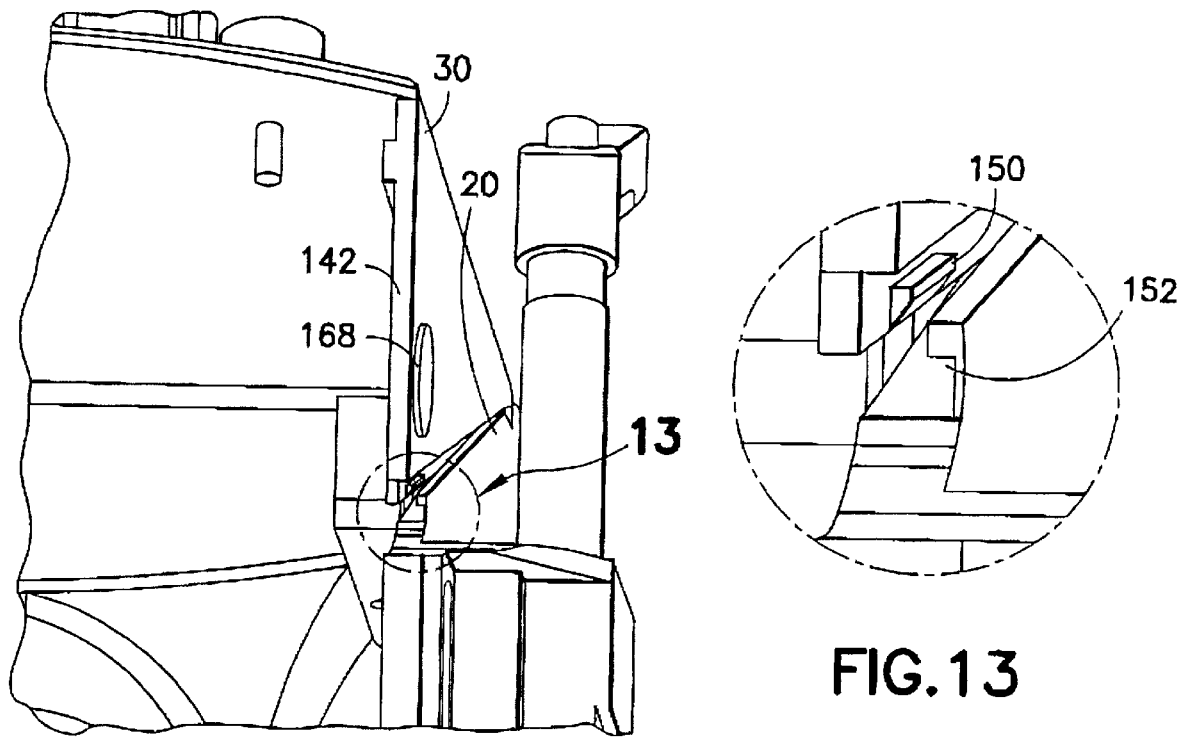
FIG.12
FIG.13
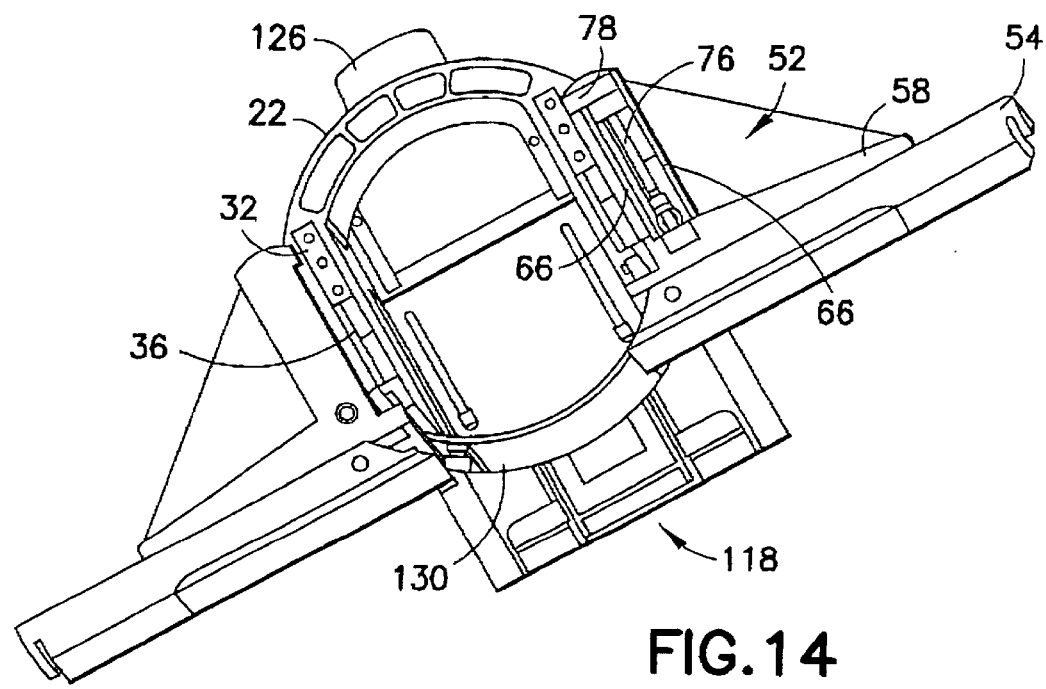
FIG.14

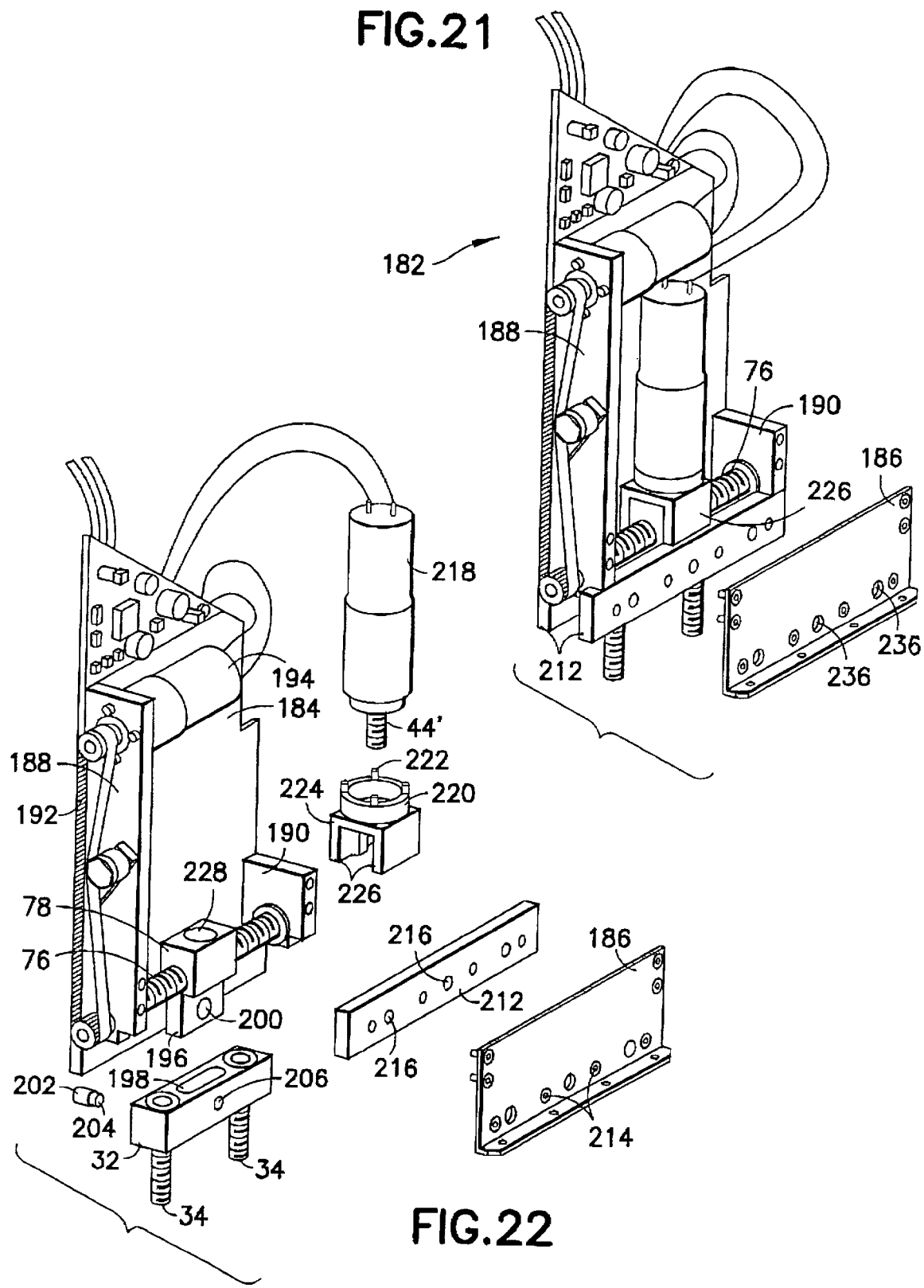

PROTECTIVE HOOD FOR WOOD MILLING MACHINES

BACKGROUND OF THE INVENTION

The invention relates to a protective hood for wood-milling machines.

A protective hood of this nature forms the subject matter of EP-B 558 692. It is for machining curved workpieces, and utilizes a guide element which may be a curve-milling stop or an approach ring in combination with an approach strip. If straight workpieces are to be machined on the stop, for example with the aid of stop plates, which can be adjusted with respect to one another, of an "integral stop" as described in EP-B 215 040, it is necessary to remove the protective hood for the curve milling and to fit a protective hood on which the stop plates can be arranged on the machine table. This change-over work is not only time-consuming, but, due to the considerable weight of the devices which have to be moved, generally also requires two people or appropriate lifting and cutting units.

An object of the present invention is to provide a protective hood for wood-milling machines which is designed in such a way that it can remain on the machine table as a universal basic element and can be used both for the installation of stop plates and for curve-milling work.

SUMMARY OF THE INVENTION

In a protective hood of the generic type the preamble of patent this object is obtained by a holding member for the movable attachment of a stop plate arranged on each of the two side walls of the protective hood, which holding member is formed of a side limb, releaseably attached to the side wall, and a front limb, which is at right angles to the side limb and bears the stop plate. The term covers not only the preferred option of removing the holding members altogether when required, but also the alternative of, for example, pivoting these members backward or sliding them upward, in order to provide sufficient space in the lower region of the protective hood to mill annular or curved workpieces. To be able to change from milling on the stop to curve milling, it is in any event sufficient to release the two holding members bearing the stop plates in accordance with the invention, so that the curved machining of wooden workpieces is possible without restrictions.

In this context, it is advantageous if the side limb is horizontally adjustable relative to the side wall of the protective hood, the two side walls of which engage in a horizontally displaceable manner in two parallel guide rails which are attached to the machine table. In this way, each of the two side walls of the protective hood can be adjustably attached to the guide rail by means of a clamping member.

According to the invention, it is possible to adjust either the entire unit, protective hood and stop plates, forward or backward via an adjustment mechanism or to adjust only one of the two stop plates on the protective hood relative to the other stop plate. The adjustment mechanism may be provided either on the protective hood or on the holding member.

The adjustment mechanisms may have adjustment spindles which can be actuated manually, and may be arranged in box-like housings which form the side limbs of the two holding members. In one of the two holding members, the adjustment mechanism is designed in such a way that it is used for the horizontal displacement of the entire unit, comprising the basic device (protective hood) and the two fitted stop plates, while the adjustment device in the other holding member is provided for relative displacement between the latter and the protective hood.

In an alternative embodiment, the two adjustment mechanisms are accommodated in the hollow side walls of the protective hood and are driven synchronously by two electric motors which displace the protective hood and any fitted stop plates together in the horizontal direction. By synchronously activating the two electric motors, it is possible to bring about easy, non-jamming movement of the protective hood, with the additional possibility of inputting the desired parameters via a keyboard using suitable control programs. In this solution, the relative displacement between one of the two stop plates and the protective hood is preferably carried out by a further electric motor which is accommodated in the side limb of the corresponding holding member.

In a refinement of this embodiment, it is particularly advantageous, in order to clamp the protective hood securely on the guide rails, to provide, in both side walls, a motor which drives a vertical spindle which acts as a clamping member. In this way, it is possible to input the desired parameters at the keyboard, so that not only the adjustment of the protective hood and the stop plate, but also the fixing of the protective hood in the working position reached, are carried out automatically.

According to another feature of the invention, the cover comprises a fixed support surface which is connected to the rear wall and on which a preferably transparent cover flap is articulatedly mounted via a hinge, which flap bears a pull-out extension plate with a rim which projects downward and on the front side of which the protective shield is arranged in a vertically adjustable manner. In this way, by pivoting up the cover flap, unimpeded access to the interior of the protective hood is created, in order, for example, to exchange the milling tool.

According to a further feature of the invention, the support surface has means for attaching a bearing block for the pivot arm of a protection and pressure device, for example in accordance with EP-B 637 276.

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 12 shows a partial illustration of the right-hand side wall of the protective hood at the moment at which the cover flap is lifted;

FIG. 13 shows the detail XIII of FIG. 12;

FIG. 14 shows a view from below of the protective hood with fitted stop plates;

FIG. 21 shows an enlarged view of one of the two adjustment mechanism units;

FIG. 22 shows an exploded view of the adjustment mechanism unit of FIG. 21;

DESCRIPTION OF THE PREFERRED EMBODIMENT

Figure 7:
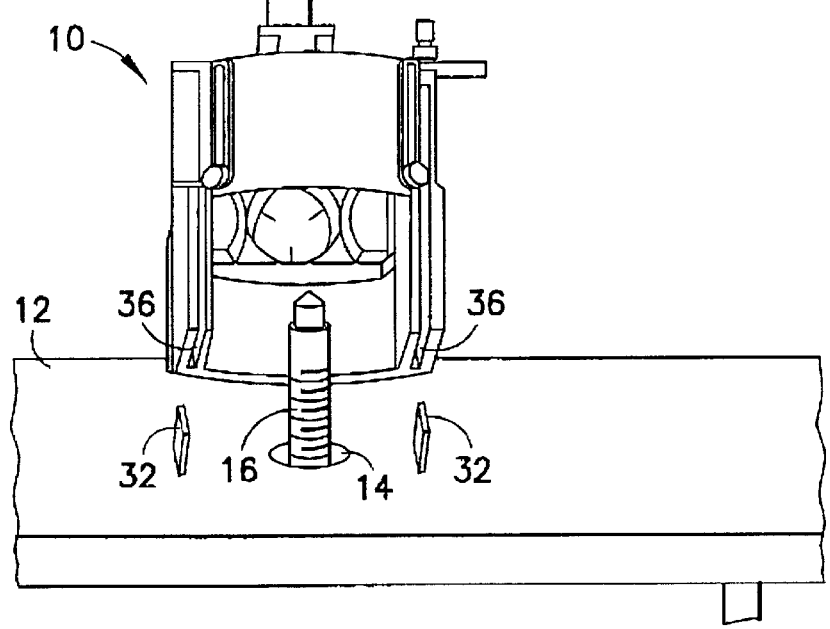
FIG. 7 shows a bottom view of the protective hood while it is being fitted onto the two guide rails.
Figure 10:
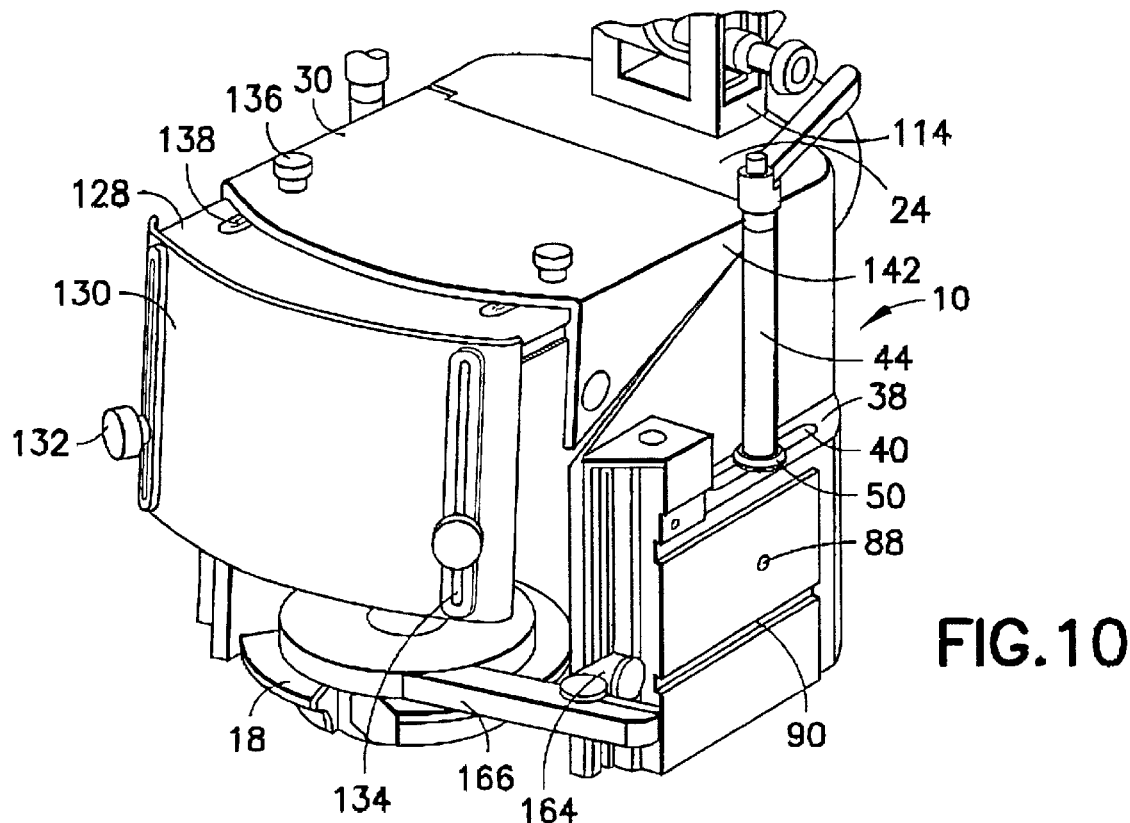
FIG. 10 shows a perspective view of the protective hood in its position for curve milling with the aid of an approach ring.
Figure 11:
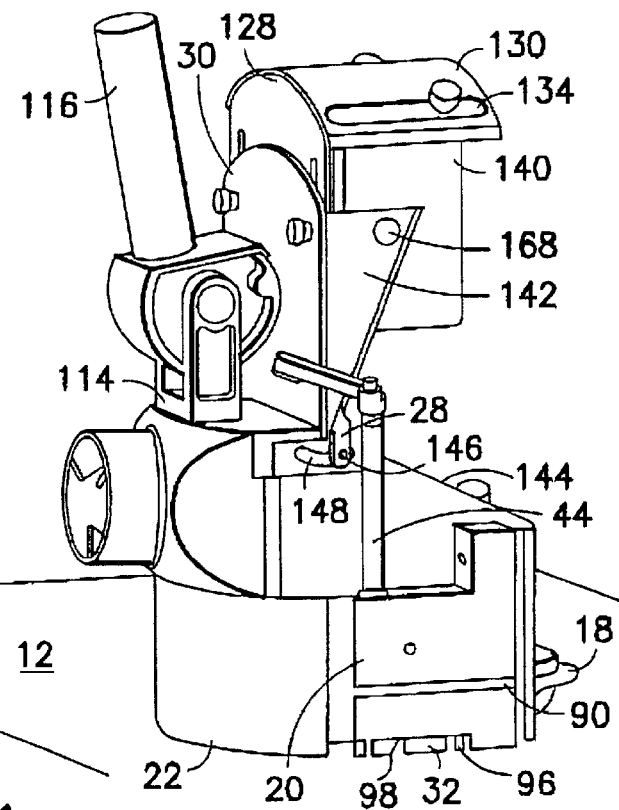
FIG. 11 shows the protective hood of FIG. 10 with the cover flap pivoted up.

Generally referring to the figures there is shown a protective hood 10 which can be attached to a horizontal machine table 12 of a wood-milling machine, as a permanently available basic element. FIG. 7 shows the machine table 12, which has a bore 14 through which a vertical spindle 16, the rotary drive of which is not shown, engages. A milling tool 18 which is shown in FIGS. 10 and 11 and during machining of wood workpieces is as far as possible covered by the protective hood 10, is attached to the spindle 12.

The protective hood 10 comprises a box-like housing which is open toward the machine table 12 and has two side walls 20 which are parallel to one another and are connected to one another by a curved rear wall 22 and a horizontal support surface 24. The planar support surface 24 forms the rear part of a cover 26, on which a cover flap 30 is articulatedly mounted by way of two side hinges 28.

Figure 8:
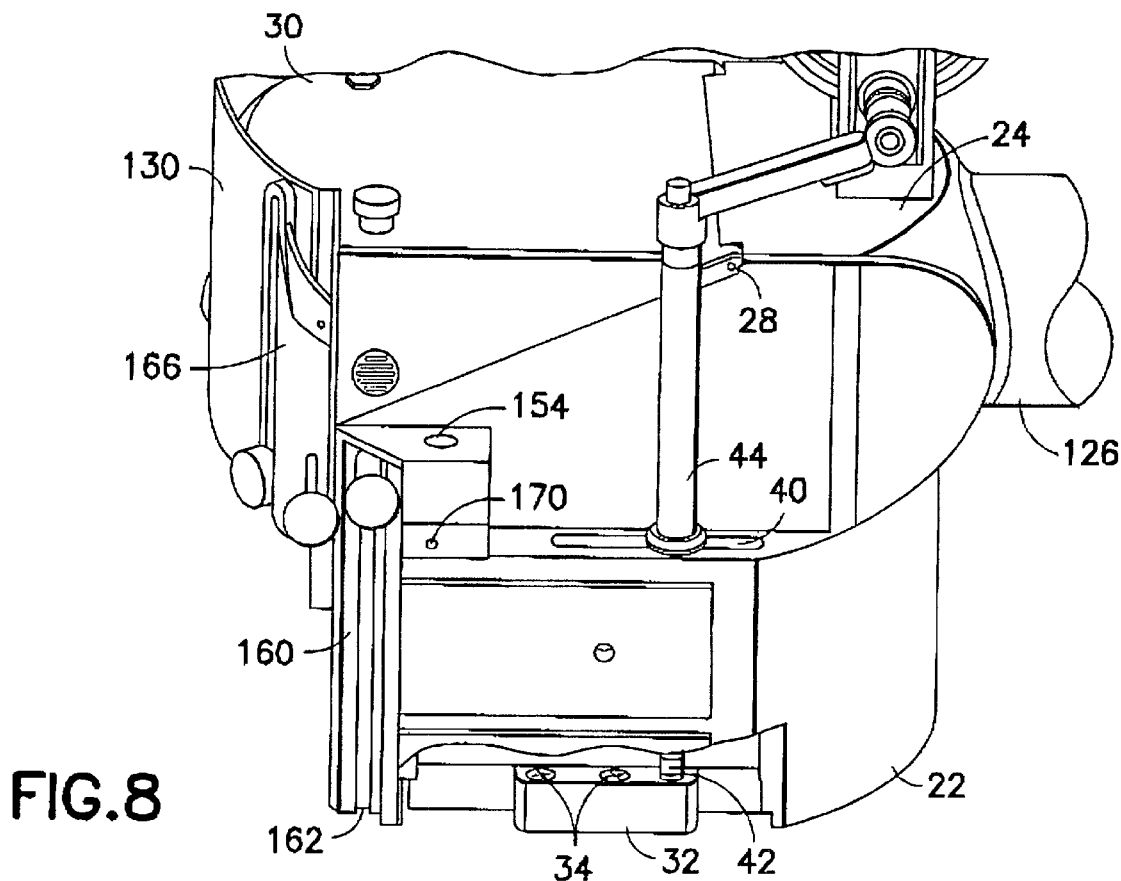
FIG. 8 shows an illustration, which is in section in the lower region, of the right-hand side wall of the protective hood.
Figure 9:
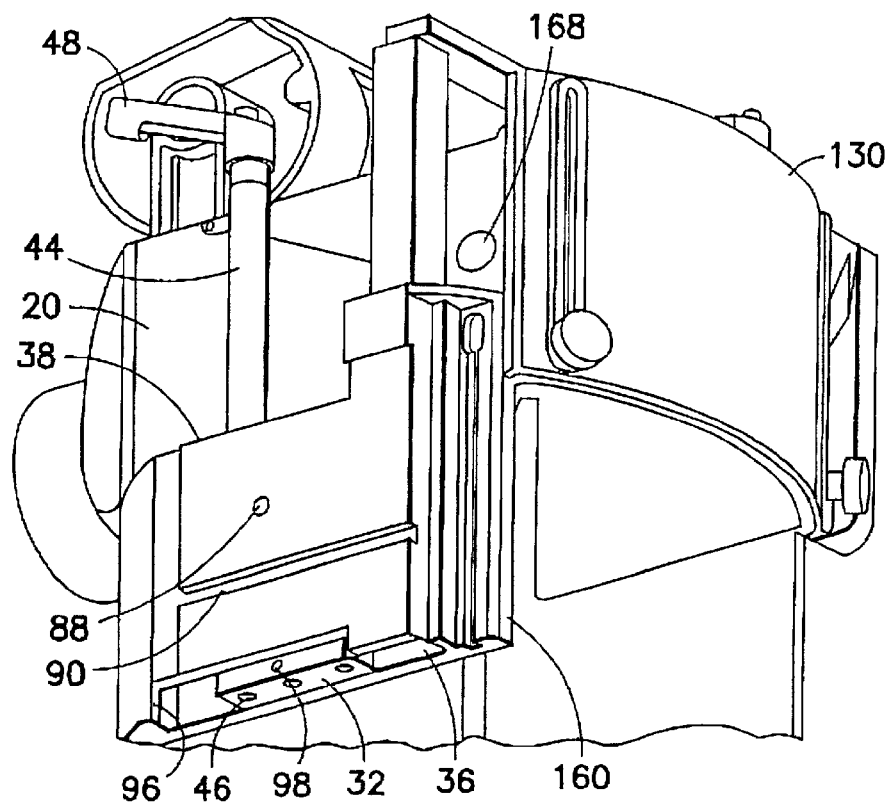
FIG. 9 shows a view from below of the left-hand side of the protective hood.

As shown in FIGS. 7 to 9, two guide rails 32 are attached to the machine table 12 parallel to one another, in each case by means of two screws 34. The distance between the rails is selected so that the protective hood 10 can be fitted onto the two guide rails 32 in such a way that they engage in elongate cutouts 36, the width of which corresponds to the width of the guide rails 32 and which are machined into the underside of the two side walls 20 of the protective hood 10.

In the exemplary embodiment shown in FIGS. 1 to 17, each side wall 20 has, in the lower region, a step 38 which projects outward and into which a vertical longitudinal slot 40 is machined. The threaded end 42 of a clamping screw 44 is fitted through this slot and is screwed into a threaded bore 46 in the guide rail 32. At its top end, the clamping screw 44 has a clamping lever 48 which lies above the cover 26 while, in its central region, it is supported by way of a collar 50 on the top side of the step 38. After the clamping screw 44 has been loosened; the protective hood 10 can be displaced forward and backward on the two guide rails 32. When the desired position is reached, the protective hood 10 can then be fixed on the machine table 12 once again by means of the clamping screw 44.

Figure 4:
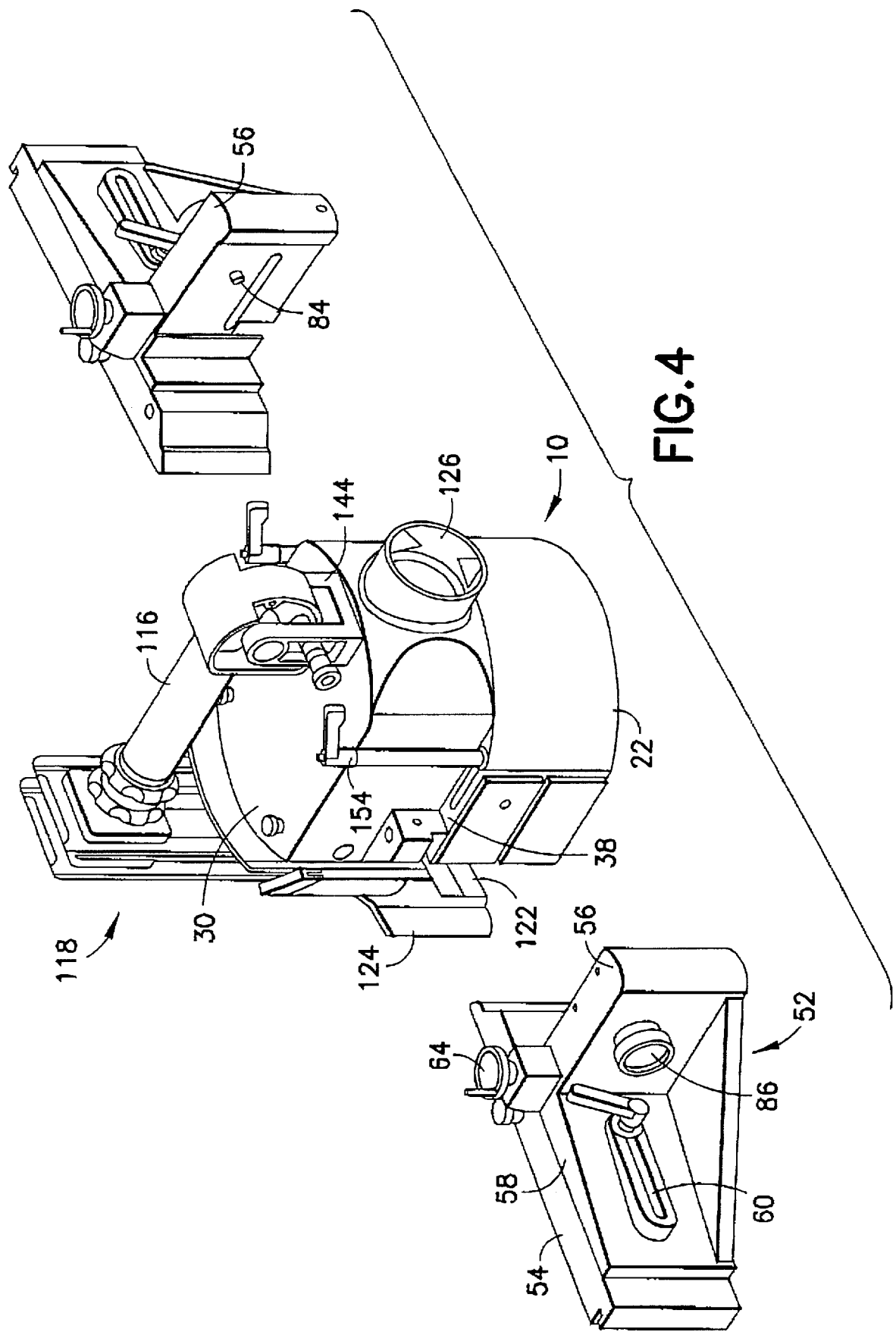
FIG. 4 shows an illustration corresponding to that shown in FIG. 2, following removal of the two holding members bearing the stop plates.

In the region of the step 38, the two side walls 22 of the protective hood 10 are designed in such a way that a holding member 52, for receiving a stop plate 54, can be releaseably attached thereto. As shown in FIG. 4, each holding member 52 comprises a side limb 56, which can be fixed on the side wall 20 in the region of its step 38, and a front limb 58, which is at right angles to the side limb and on which the corresponding stop plate 54 can be arranged. For this purpose, the front limb 58 has a horizontal slot 60, through which a clamping screw 62 engages in order to fix the stop plate 54 in such a manner that it can be adjusted in the horizontal direction.

As shown in FIGS. 1 to 5 and 15 to 17, in each case one adjustment mechanism with an adjustment wheel 64, which in the exemplary embodiment illustrated is arranged on each of the two holding members 52, specifically in the region of the front limb 58, so that it can easily be reached and operated by the user, is provided on both sides of the protective hood 10. With the aid of one adjustment wheel 64—in the exemplary embodiment with the aid of the adjustment wheel 64 which is arranged on the left-hand holding member 52, as seen from the front in FIG. 1—the entire unit can be mechanically adjusted forward and backward, while the other adjustment wheel 64—in the exemplary embodiment the right-hand adjustment wheel—is used to displace the right-hand holding member 52 relative to the protective hood 10.

Figure 15:
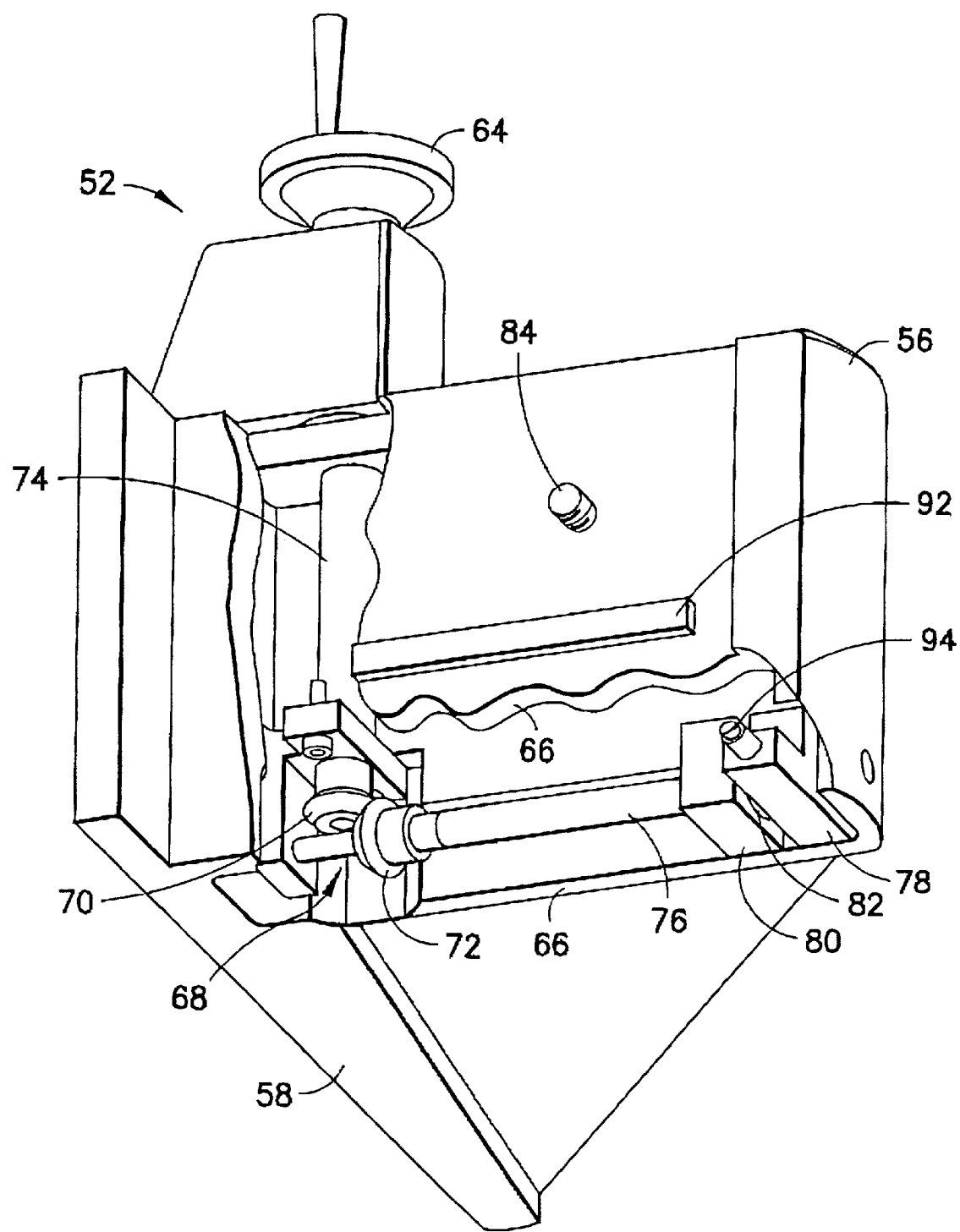
FIG. 15 shows a partially sectional view, on an enlarged scale, of the left-hand holding member with angular gear for the adjustment of the entire unit.
Figure 16:
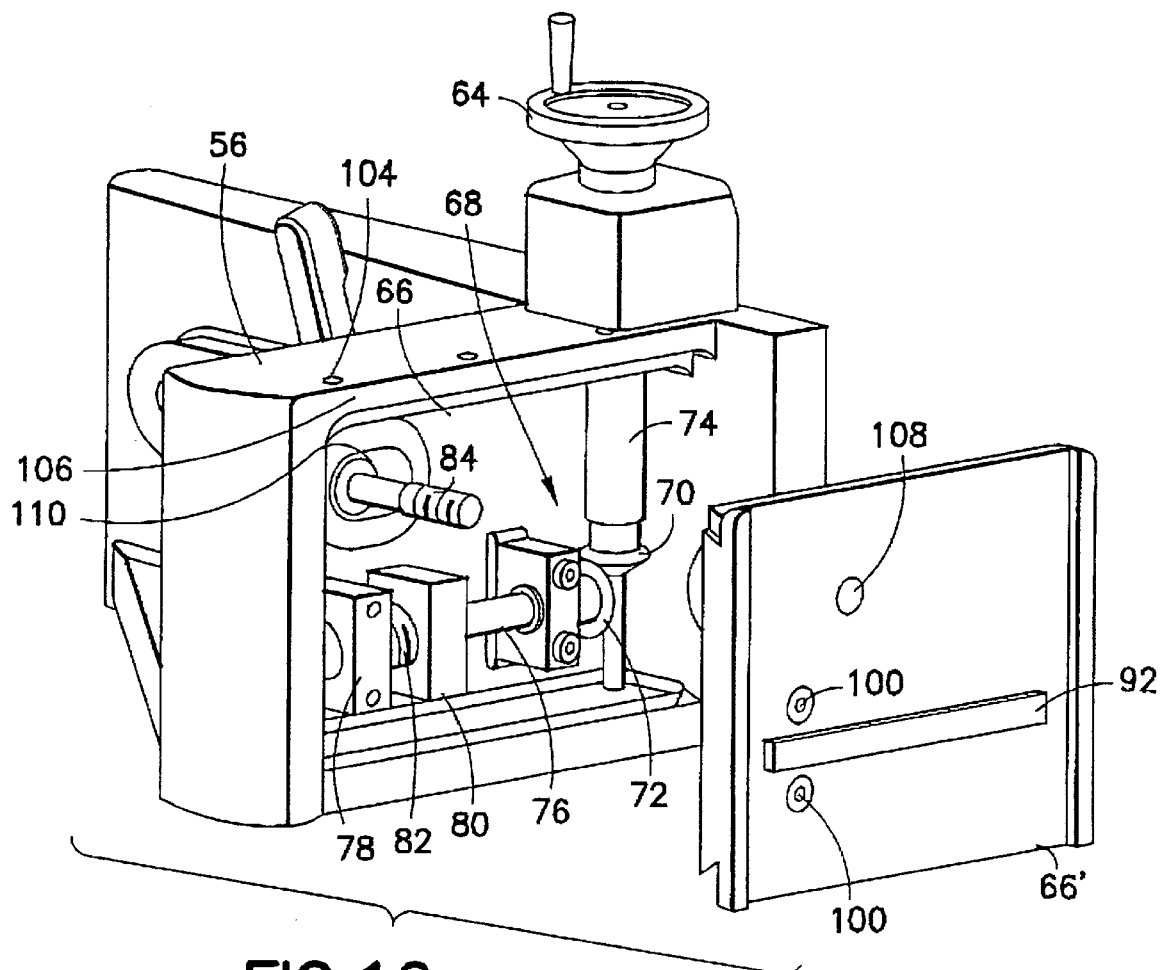
FIG. 16 shows a similar view to that of FIG. 15 of the open right-hand holding member.

The side limb 56 of each holding member 52 comprises a box-like housing with two parallel longitudinal walls 66 (cf. FIGS. 14 to 16). Both in the case of the left-hand holding member 52 as shown in FIG. 15 and in the case of the right-hand holding member as shown in FIG. 16, this housing accommodates an angular gear 68 which has two bevel gears 70 and 72 which mesh with one another. The bevel gear 70 is attached to the bottom end of a vertical adjustment spindle 74, the top end of which bears the adjustment wheel 64 which can be actuated by hand. The other bevel gear 72 is attached to a horizontal threaded spindle 76 which is mounted in the housing, parallel to the two longitudinal walls 66, and bears an adjustment nut 78 which, on rotation of the threaded spindle 76, is displaced in the axial direction on the latter. Furthermore, a support nut 80 is fitted to the threaded spindle 76; disk springs 82 are fitted between the support nut 80 and the adjustment nut 78, which springs ensure that the adjustment nut 78 is mounted without play on the adjustment spindle 74.

As mentioned above, the left-hand holding member 52 (FIG. 15) is arranged in a fixed position on the protective hood 10. This purpose is served by a through-bolt 84 which has an easily actuable handwheel 86, the threaded end of which engages in the threaded bore 88 in the adjoining side wall 20 of the protective hood 10 (cf. FIG. 9). On this side wall 20 there is formed a longitudinal groove 90 in which a strip 92 formed on the opposite longitudinal wall 66 of the holding member 52 engages, thus ensuring that the holding member 52 is positioned accurately on the side wall 20 of the protective hood 10.

A mandrel 94 projects from the adjustment nut 78 of the left-hand holding member 52 shown in FIG. 15, which mandrel engages through an elongate opening 96 (cf. FIG. 9) on the bottom edge of the opposite side wall 20 of the protective hood 10, in a bore 98 in the associated guide rail 32. After the two clamping screws 44 have been loosened, it is in this way possible to adjust the entire unit—protective hood 10 together with the two holding members 52 and the stop plates 54—forward or backward on the machine table 12. For this purpose, the left-hand adjustment wheel 64 is rotated and, via the angular gear 68, generates a relative adjustment of the adjustment nut 78 together with its mandrel 94 on the threaded spindle 76.

Figure 17:
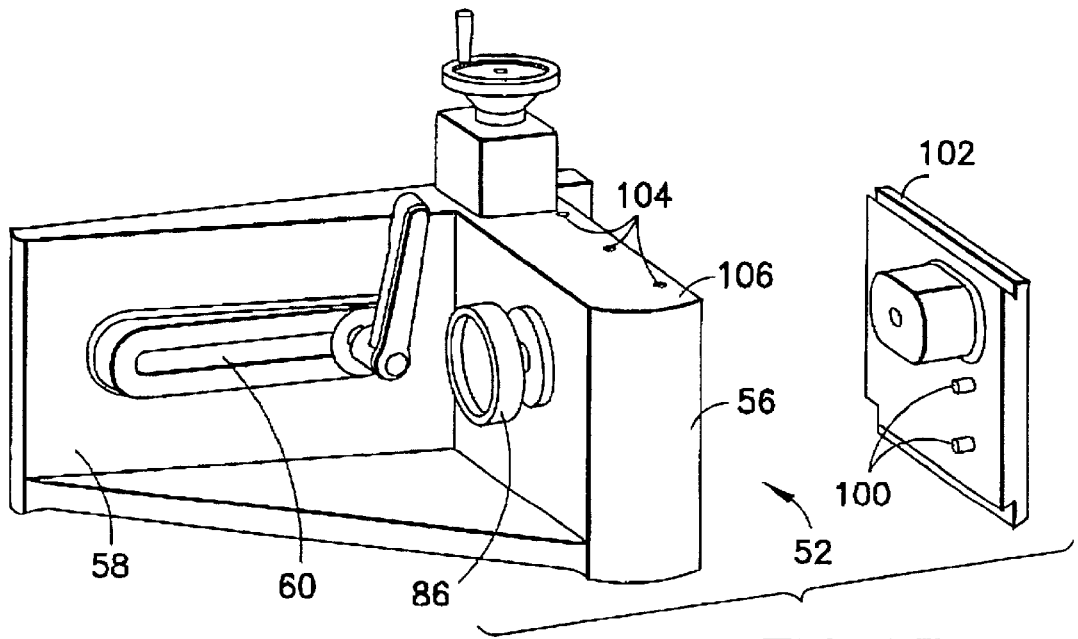
FIG. 17 shows another illustration of the right-hand holding member in accordance with FIG. 16.

As shown in FIGS. 16 and 17, the box-like housing of the side limb 56 of the right-hand holding member 52 has two longitudinal walls 66, 66' which can be displaced relative to one another. The outer longitudinal wall 66', which bears against the side wall 20 of the protective hood 10, is attached to the adjustment nut 78 of the angular gear 68 with the aid of two screws 100 and is mounted displaceably on a guide strip 102 which, with the aid of three screws 104, is attached to the inner side of the top wall 106 of the box-like housing. Similarly to the case of the left-hand holding member 52, a strip 92 is formed on the outer side of the displaceable longitudinal wall 66', which strip engages in a longitudinal groove 90 of the opposite side wall 20 of the protective hood 10. In this case too, the holding member 52 is attached to the opposite side wall 20 of the protective hood 10 via a through-bolt 84. In this case too, the threaded end of the through-bolt 64 engages through a bore 108 in the longitudinal wall 66', into a threaded bore 88 (FIG. 10) in the opposite side wall 20 of the protective hood 10. The other end of the through-bolt 84, to which the handwheel 86 is attached, is guided through a horizontal elongate hole 110 in the fixed longitudinal wall 66 of the holding member 52. When the adjustment wheel 64 of the adjustment spindle 74 is turned, in the case of the right-hand holding member 52, this member moves over the guide strip 102 on the longitudinal wall 66', which is attached to the side wall 20 of the protective hood 10, so that it is possible to adjust the right-hand holding member 52 with fitted stop plate 54 relative to the left-hand holding member 52 with stop plate 54.

Figure 1:
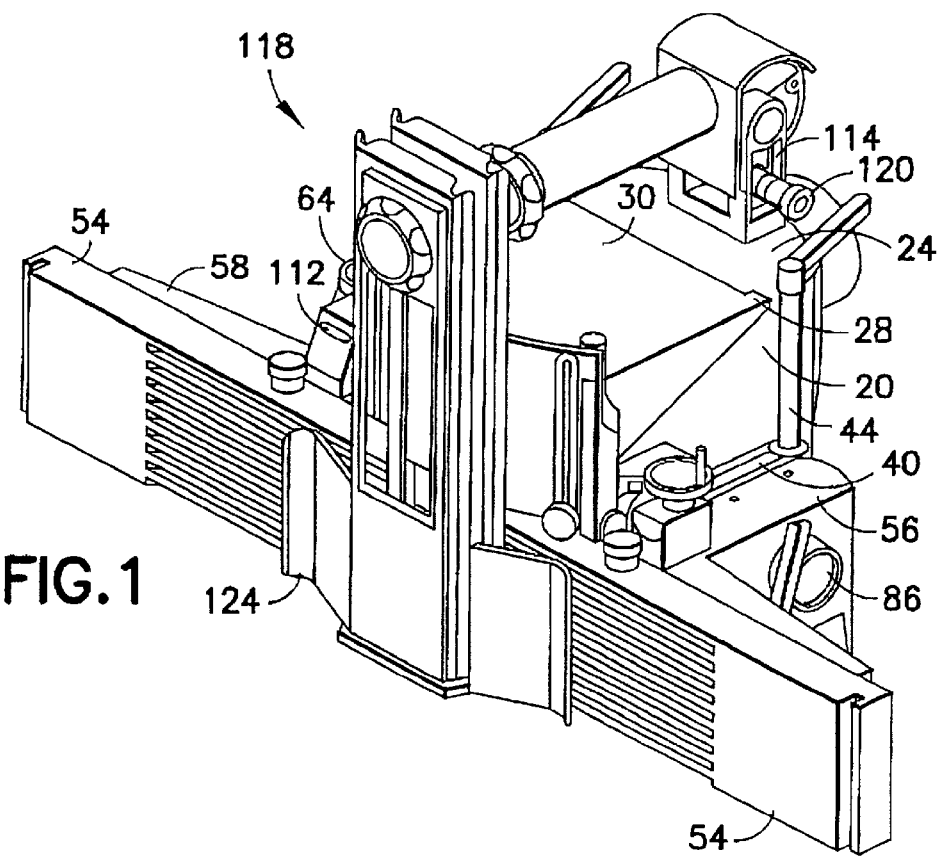
FIG. 1 shows a front view of the protective hood with fitted stop plates and a protection and pressure device attached to the support surface of the cover, in accordance with a first exemplary embodiment.
Figure 2:
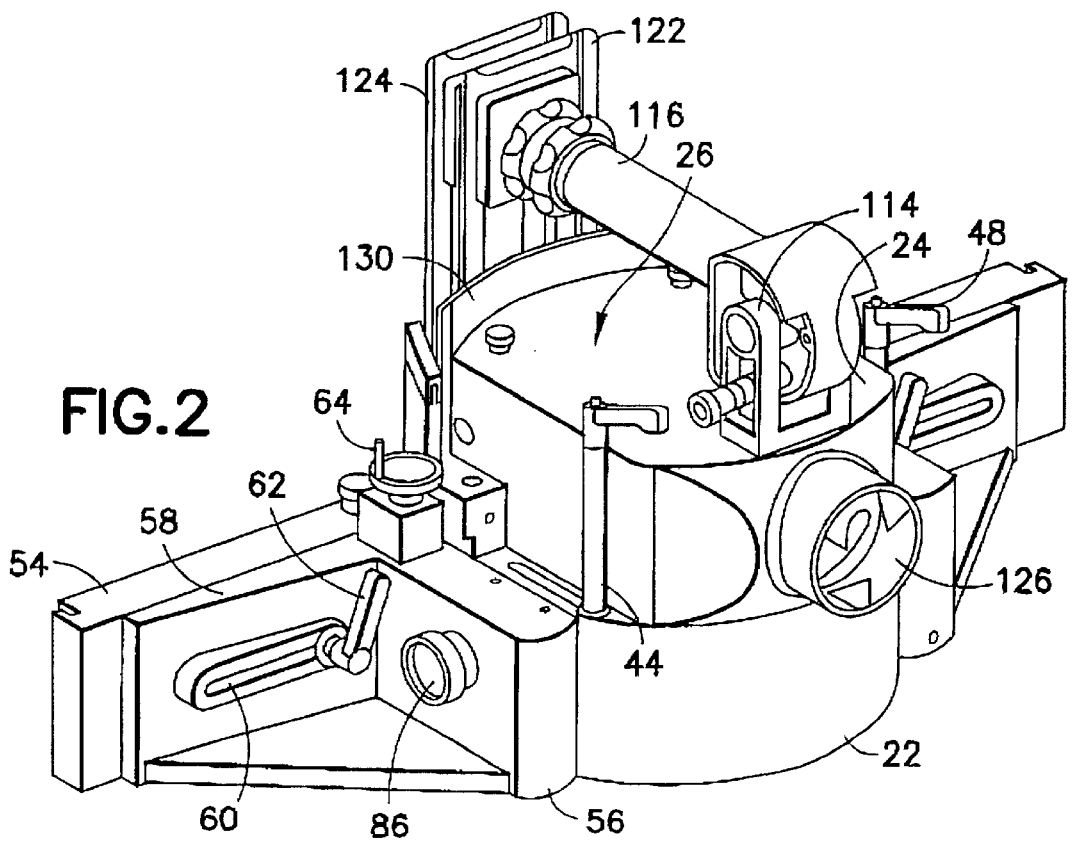
FIG. 2 shows a rear view of the unit shown in FIG. 1.
Figure 3:
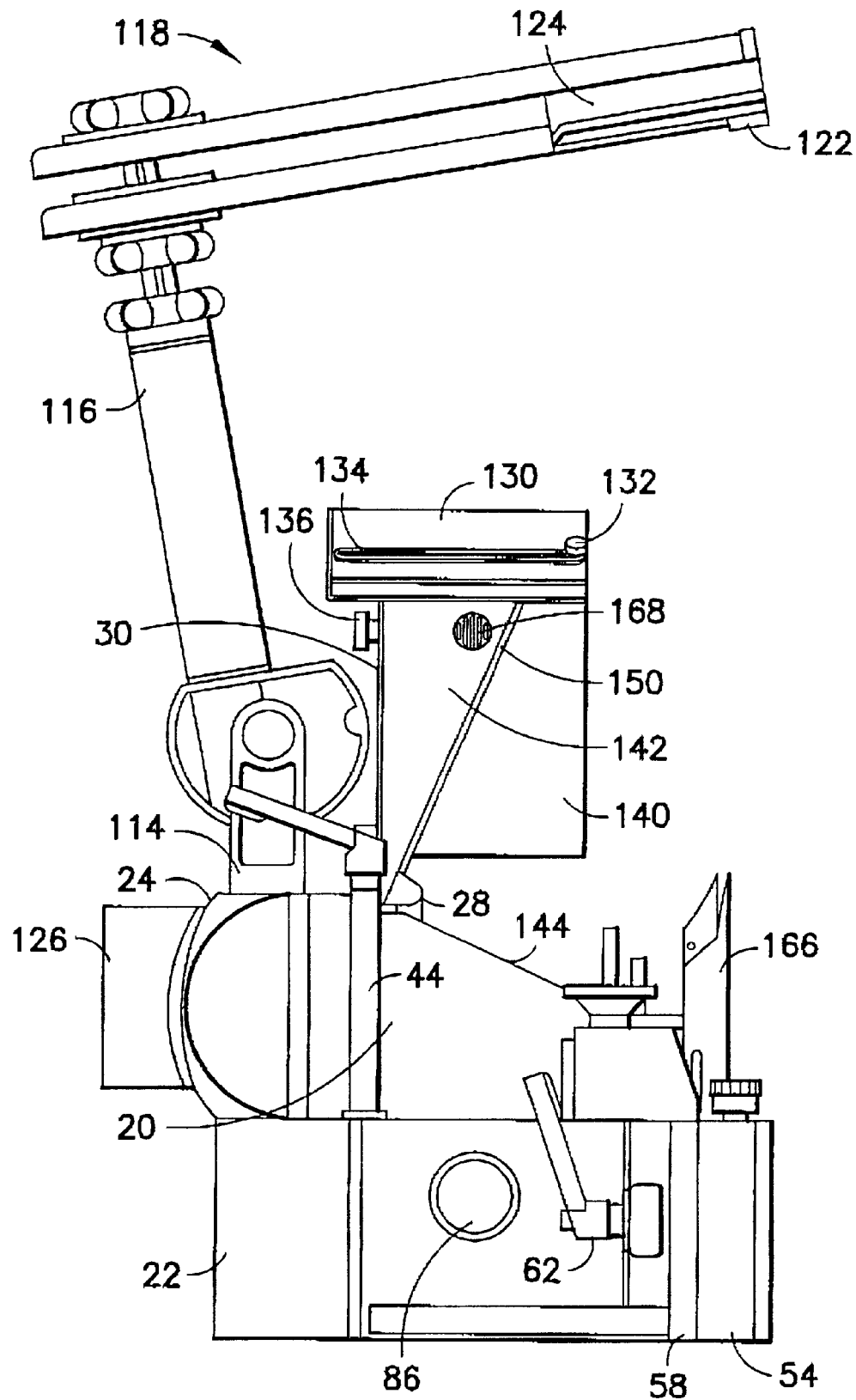
FIG. 3 shows a side view of the unit of FIGS. 1 and 2 with the cover flap pivoted up and the protection and pressure device turned upward.
Figure 5:
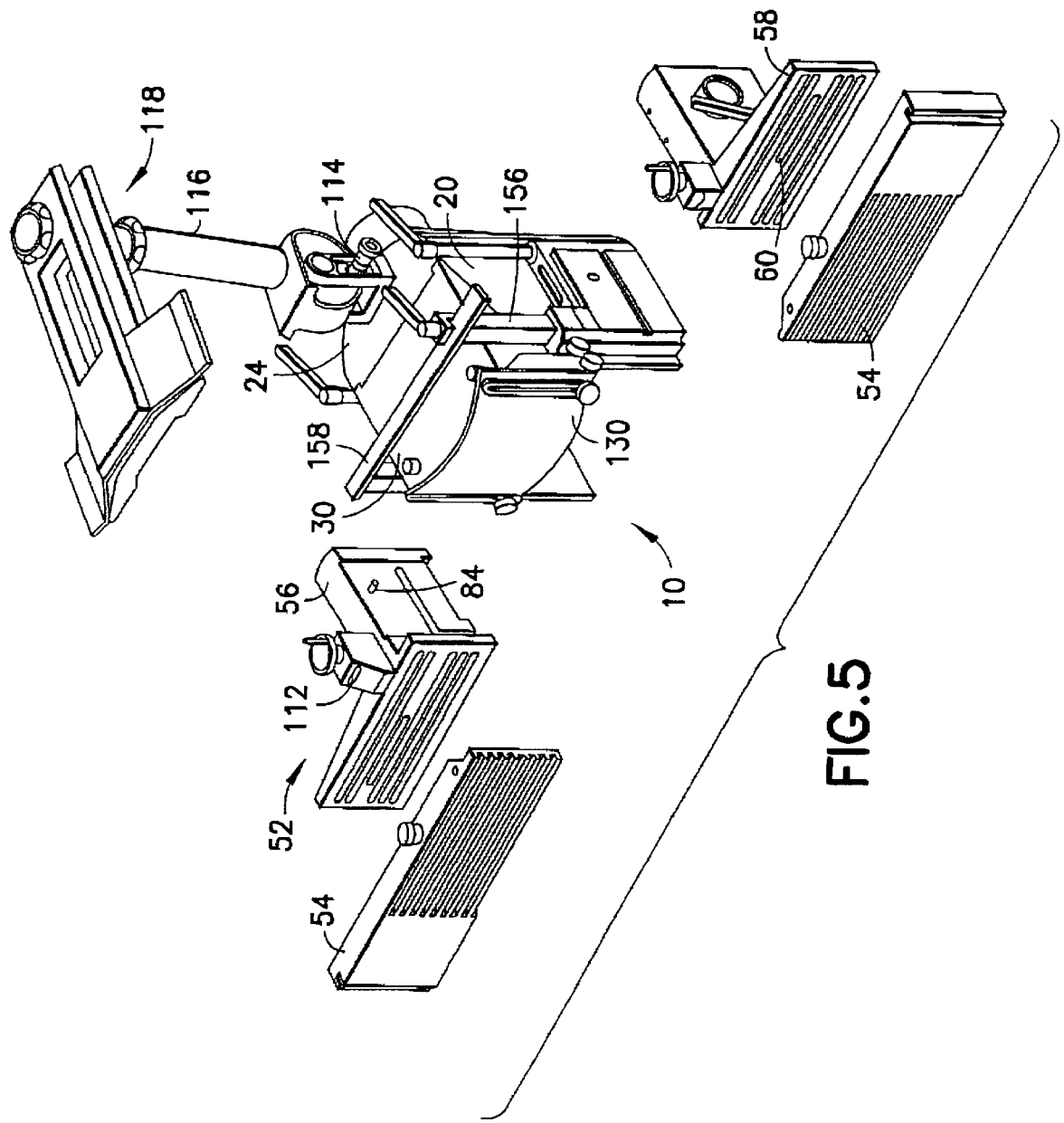
FIG. 5 shows a front view of the unit of FIG. 4 with the protection and pressure device turned upward and stop plates removed from the holding members.

FIGS. 1 and 5 show that the adjustment mechanism on the left-hand side of the protective hood 10 is assigned a preferably digital measurement scale with a visual display 112.

As mentioned above, the rear part of the cover 26 is designed as a support surface 24 to which a bearing block 114 for the pivot arm 116 of a protection and pressure device 118 can be attached, which device is designed, for example, as described in European Patent No. 637 276. The front end of the pivot arm 116, which by means of a locking button 120 can be held in a horizontal operating position and a pivoted-up position on the bearing block 114, at its front end adjustably bears a pressure shoe 122 which acts on the top side of a workpiece and a guide member 124 which presses the workpiece against the stop 54 in the horizontal direction. If the protective hood 10 according to the invention is to be used for curve milling, which involves removal of the two holding members 52 with the stop plate 54, the protection and pressure device 118 is pivoted upward into the waiting position shown in FIGS. 3, 5 and 6.

A horizontal connection stub 126, which can be connected to an extraction device, is formed in the upper region of the rear wheel 22 of the protective hood 10. The connection stub 116 is in this case arranged directly beneath the support surface 24 of the cover 26, so that there is sufficient space above the machine table 12 to guide through curved workpieces.

On its underside, the transparent cover flap 30 bears a pull-out extension plate 128, which is likewise transparent, having a downwardly projecting rim, on the front side of which a curved, transparent protective shield 130 is arranged. This shield is attached in a vertically adjustable manner on the front side of the rim of the extension plate 128 with the aid of two side fixing screws 132 which engage through vertical longitudinal slots 134 in the protective shield 130.

The extension plate 128 is held on the underside of the cover flap 30 by two clamping screws 136 which engage in two parallel longitudinal slots 138 in the extension plate 128, so that the latter can be displaced in the cover flap 30 in the manner of a drawer. The front side of the rim of the extension plate 128 merges into two side plates 140 which are parallel to one another and are guided between two side walls 142 which project downward from the cover flap 30.

The two side walls 142 of the cover flap 30 are in the shape of a triangle which converges toward the hinges 28, and the adjoining side walls 20 of the protective hood 10 have a correspondingly beveled edge 144 (cf. FIGS. 10 to 13). In this way, in the pivoted-up position of the cover flap 30, there is an opening which widens extensively toward the front side of the protective hood 10 and facilitates access to the interior of the protective hood 10. In this open position, the cover flap 30 is locked in place by a latching element 146 which latches elastically into a seat which is formed in a curved guide groove 148 on both side walls 20 of the protective hood 10.

FIGS. 12 and 13 show that the cover flap 30 is held in its horizontal, closed position by means of a protrusion 150 which latches elastically into an undercut 152 which is machined into the inner side of the side wall 20 of the protective hood 10. To open the cover flap 30, it is sufficient to press on two mutually opposite points 168 by means of a finger, with the result that the two side walls 142 are bent elastically and resiliently inward and the protrusions 150 are disengaged from the undercuts 152.

FIGS. 2 to 6 show that a vertical holding bore 154 is machined in the front region of the step 38 of each side wall 20, into which holding bore support columns 156 of a support rail 158 can be fitted, to which rail pressure or guide members (not shown in more detail) can be attached.

It can be seen from FIGS. 8 to 10 that a vertical groove 162 is machined into that region of the front edge 160 of at least one of the two side walls 20 which faces laterally outward, which groove is used to receive a clamping block 164, which bears a pivotable approach strip 166, in a vertically adjustable manner (FIG. 10).

Figure 6:
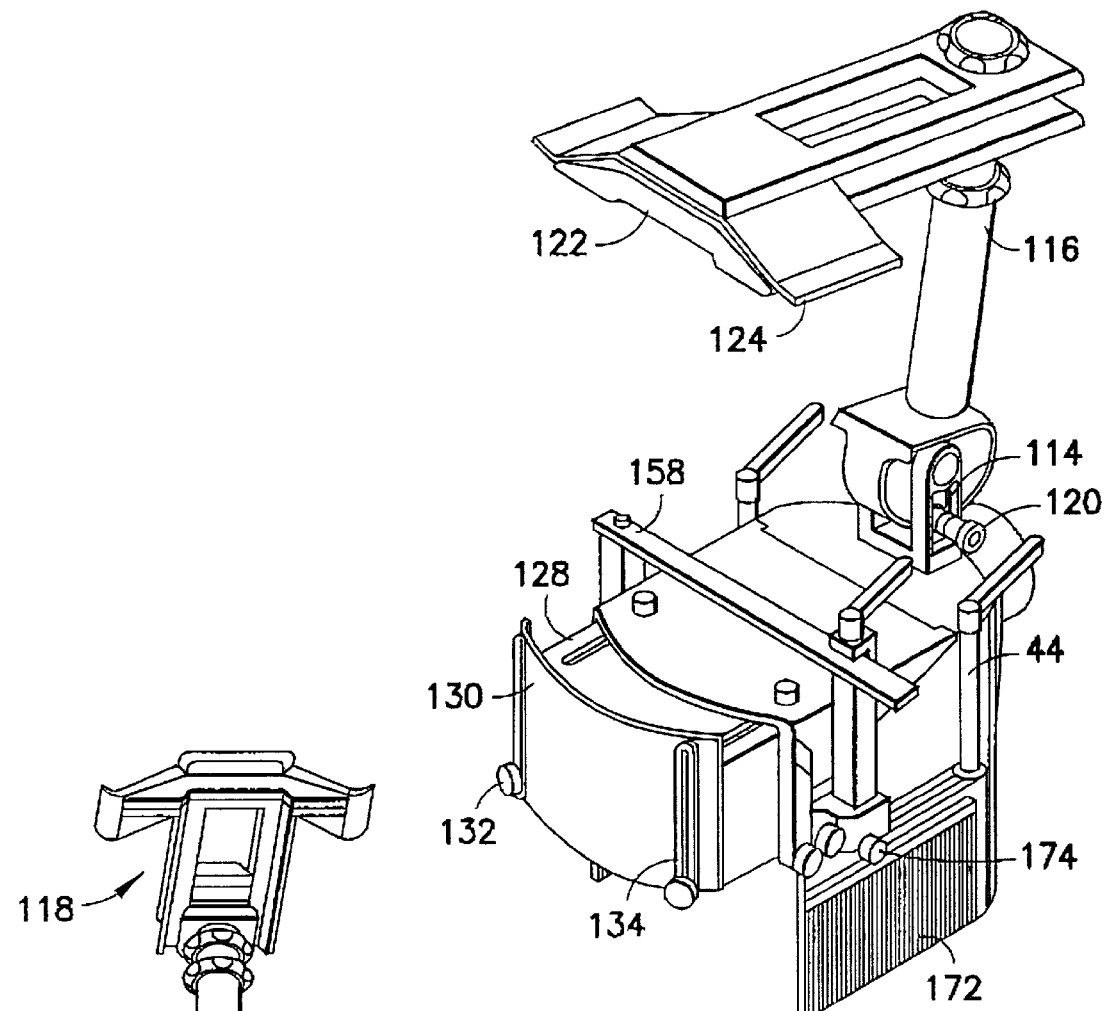
FIG. 6 shows the protective hood in its position for curve milling with the protection and pressure device turned upward.

A threaded bore 170 for the adjustable attachment of a dust-protective curtain 172 by means of a clamping screw 174 is machined into both side walls 20 of the protective hood 10 (FIGS. 6 and 8).

FIGS. 18 to 26 show a second exemplary embodiment, which differs from the embodiment described above essentially through the fact that the adjustment mechanism can be controlled by means of preferably electrically operated motors and are accommodated not in the side limbs of the holding members 52, but rather in the side walls 20 of the protective hood 10, which is available as a basic unit.

Figure 18:
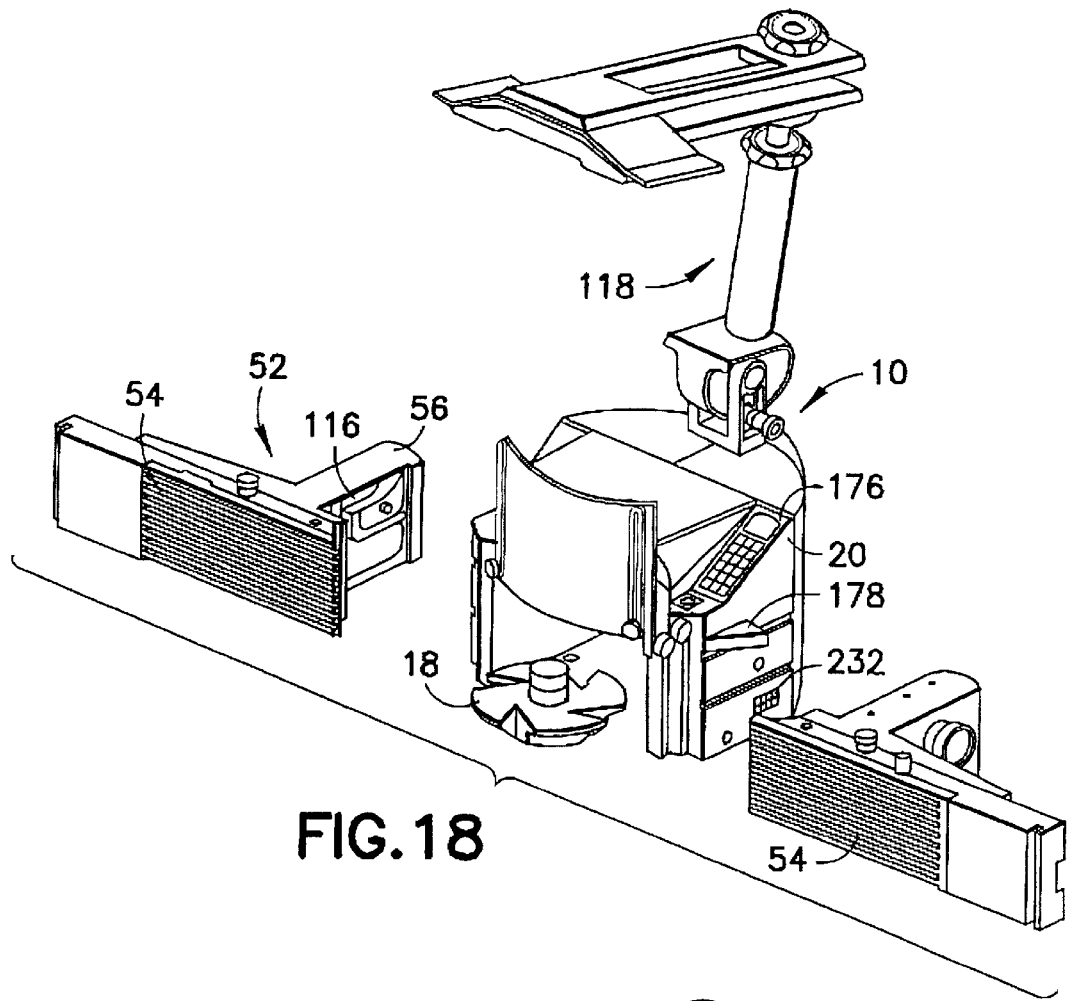
FIG. 18 shows a similar view to that shown in FIG. 5, of an alternate embodiment.

FIG. 18 shows this variant of the protective hood 10 after the holding members 52 for the two stop plates 54 have been removed. The adjustment mechanisms, which are explained in more detail below and are electrically driven, are accommodated in the two side walls 20 of the protective hood 10. For this purpose, a keyboard 176 is accommodated on an inclined surface of one of the two side walls 20, which keyboard can be used to input the desired values for positioning the protective hood 10 and the holding members 52.

Figure 19:
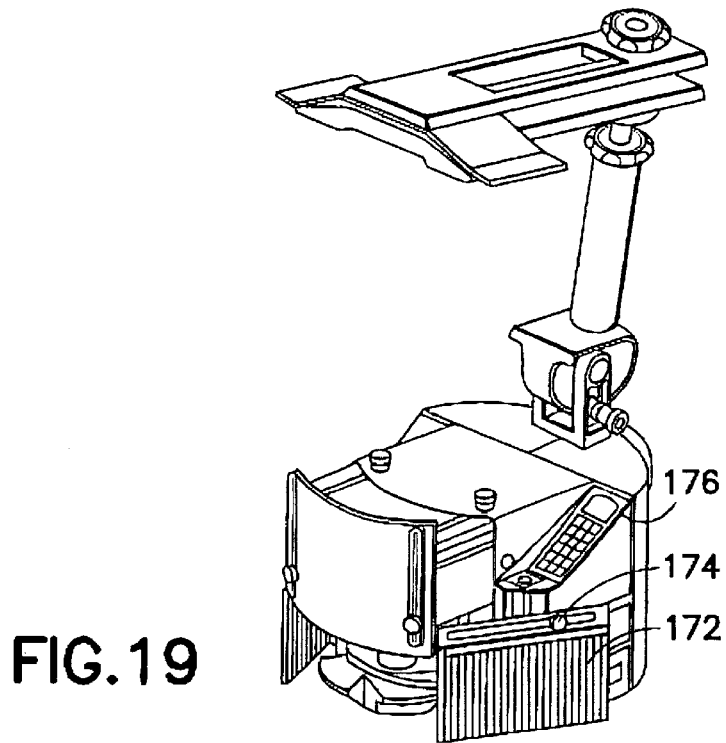
FIG. 19 shows the protective hood of FIG. 18 in its position for curve milling with the protection and pressure device turned upward.

FIG. 19 shows the protective hood 10 from FIG. 18 in its use position for curve milling. In this figure, it can be seen that the two dust-protective curtains 172 are attached so that they run at an angle toward one another, by means of the clamping screws 174, to holding brackets 178 which are formed on the two side walls 20.

Figure 20:
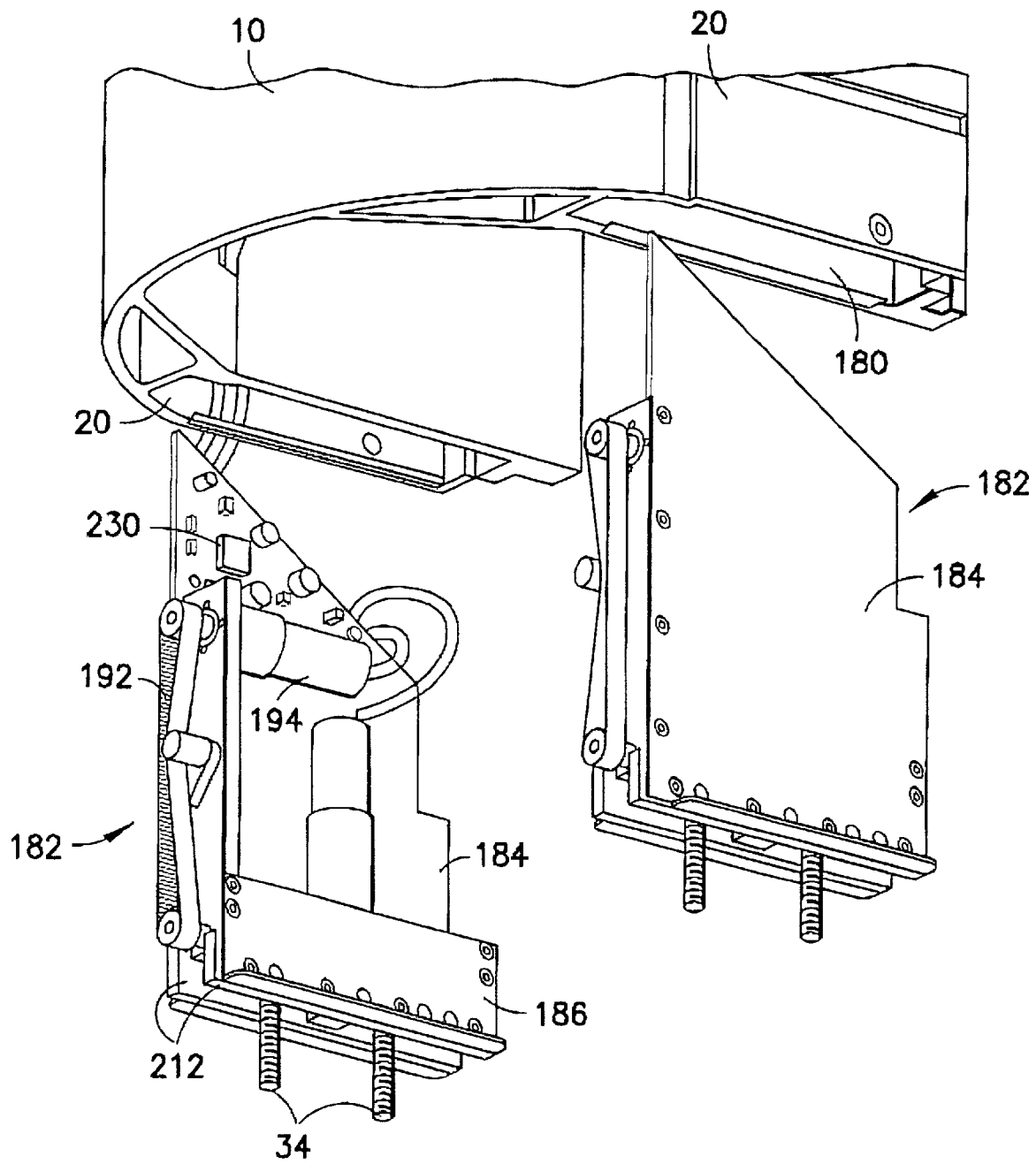
FIG. 20 shows the bottom region of the protective hood from FIGS. 18 and 19, with the adjustment mechanism removed.

FIG. 20 shows a perspective view of the underside of the protective hood 10, the side walls 20 of which have a cavity 180, each of which serves to receive a push-in unit 182 which accommodates the adjustment mechanisms. Each unit 182 comprises an outwardly directed, approximately trapezoid-shaped inner wall 184 and a rectangular, significantly lower inner wall 186 which is oriented parallel thereto. The two inner walls 184 and 186 are connected to one another via a rear wall 188 and a front wall 190, between which the threaded spindle 76 which has already been explained with reference to the previous exemplary embodiment is rotatably mounted. The adjustment nut 78 is positioned on this threaded spindle. The threaded spindle 76 is driven, via a toothed belt 192, by an electric motor 194 which is attached to the rear wall 188 with its axis oriented horizontally.

As shown in FIG. 22, an extension 196 projects downward from the adjustment nut 78, which extension engages in an opening 198 in the guide rail 32, which is attached to the machine table 12 by means of the two screws 34. The extension 196 has a bore 200 through which a threaded bolt 202 engages, the threaded end 204 of which bolt is screwed into a threaded bore 206 in the guide rail 32. The opposite end of the threaded bolt 202 can be reached from the outside, through a bore 208, with the aid of a screwdriver 210 (cf. FIG. 26). After assembly, the bore 208 can be closed off by means of a dustproof stopper.

Figure 25:
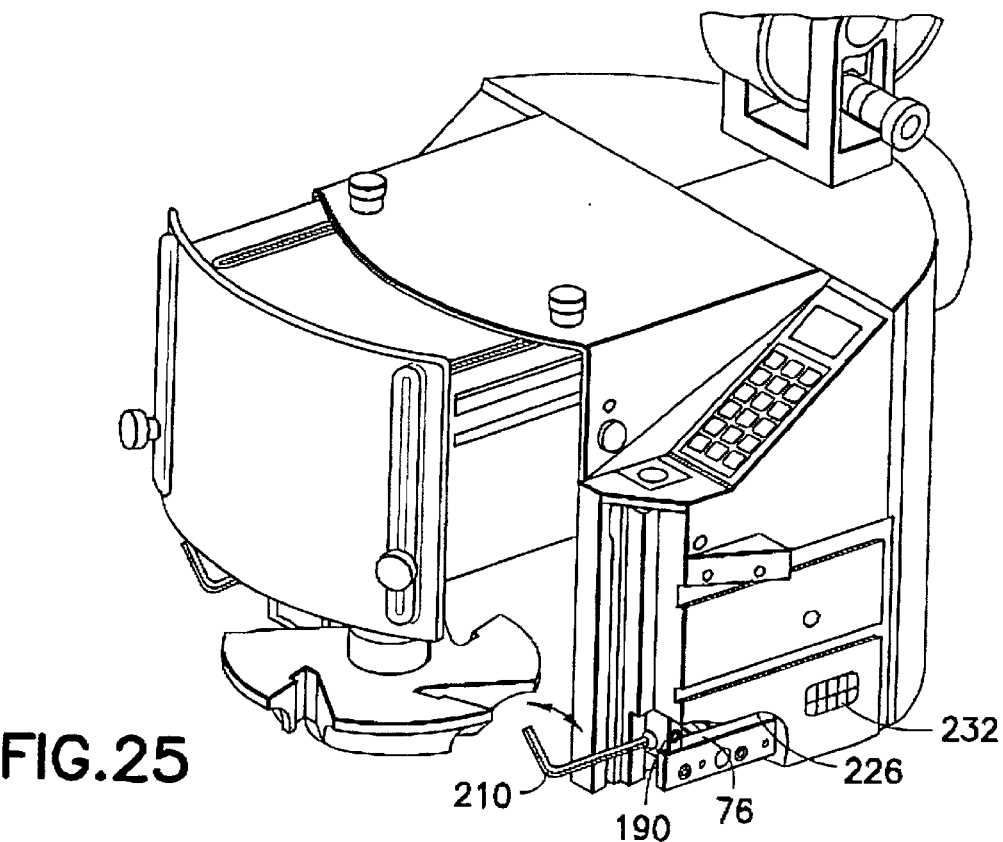
FIG. 25 shows the protective hood (basic unit) with a cut-away side wall.
Figure 26:
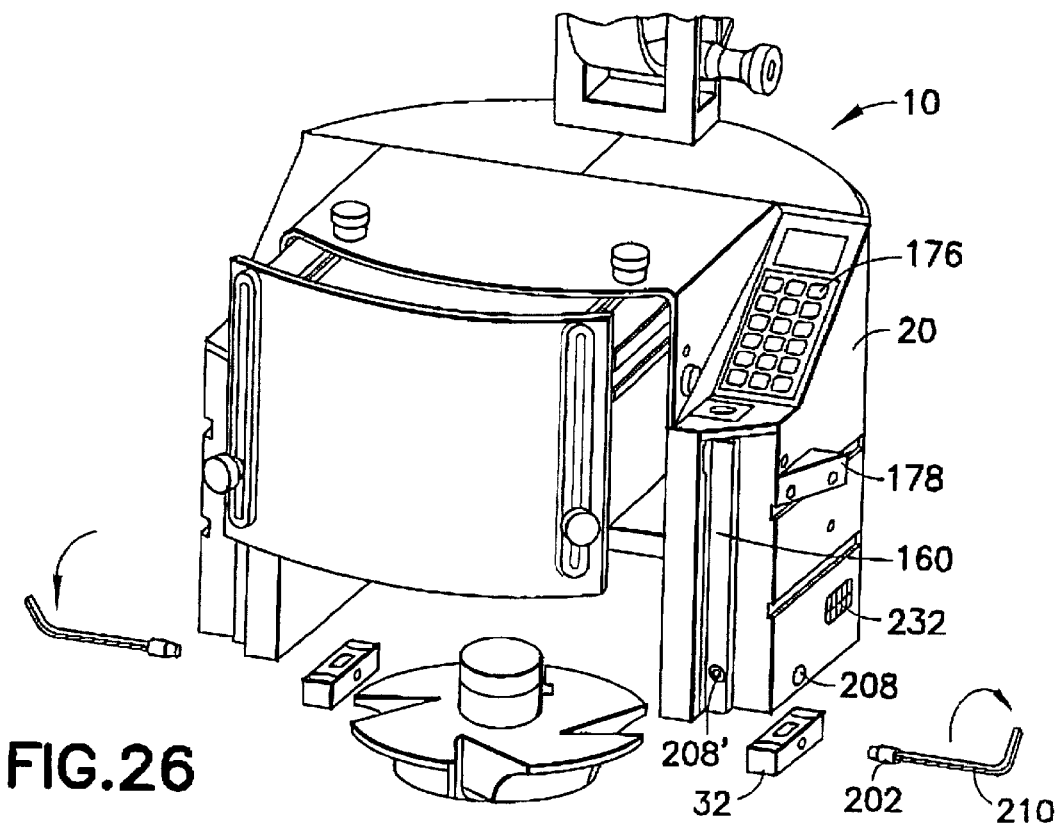
FIG. 26 shows the protective hood in accordance with FIG. 25 after it has been removed from the guide rails.

To allow the threaded spindle 76 to be rotated manually from the outside, for example if, in the event of a defect in the motor 194, the threaded bolt 202 can no longer be moved into a position in which it is aligned with the bore 208, a bore 208', which can likewise be closed off by means of a dustproof stopper, is machined into the front edge 160 of the side wall 20 of the protective hood 10. After the dustproof stopper has been removed, it is possible, as shown in FIG. 25, to use a screwdriver 210 to act on the threaded spindle 76 on its head facing toward the bore 208' and to rotate it manually until the aligned position between threaded bolt 202 and bore 208 in the side wall 20 is reached, so that the screwdriver 210 can then act on the threaded bolt 202 through the bore 208, thus allowing dismantling to take place.

FIGS. 21 and 22 show that a strip 212 is attached, with the aid of screws 214, to both the trapezoid-shaped inner wall 184 and the rectangular inner wall 186, which both consist of sheet metal. The distance between the two strips 212 corresponds to the width of the guide rail 32, it being possible to adjust this distance in such a way that play-free sliding guidance on the guide rail 32 is ensured. Support screws (not shown in more detail) are used to adjust the play, which screws are screwed into threaded bores 216 in the corresponding strip 212 from the inside, are adjustable and pass through bores 236 in the associated inner wall 184 or 186, so that their ends are supported on the inner surfaces of the cavity 180 of the side wall 20.

Instead of the clamping screws 44 which were explained in the first exemplary embodiment, in the second exemplary embodiment the horizontal position of the two side walls 20 of the protective hood 10 is fixed on the guide rails 32 by a vertical threaded spindle 44' which is driven by a further electric motor 218. As shown in FIG. 22, a slide 224 is attached to the latter via a ring 220 with axial screws 222, which slide, in cross-section, is in the form of an upside-down U, the vertical limbs 226 of which are supported on the top side of the two strips 212. The threaded end of the vertical spindle 44' engages in a threaded bore 228 in the adjustment nut 78.

As shown in FIGS. 20 to 22, an electronic circuit board 230, which is used to control the motors 194 and 218, is arranged on the trapezoid-shaped inner wall 184. These motors are connected to one another and to the keyboard 176 via electrical contact elements 232, in order to ensure synchronous actuation. The contact elements 232 are provided both in the side walls 20 of the protective hood 10 and in the opposite side limbs 56 of the holding members 52.

When the two motors 194 have carried out the desired horizontal adjustment of the protective hood 10, the motor 218 is activated, the vertical spindle 44' of which screws into the threaded bore 228 and, in the process, presses the slide downward relative to the adjustment nut 78, so that its two limbs 226 are supported on the strip 212. Thus, the protective hood 10 is blocked in its set position. The unlocking is brought about by rotating the spindle 44' in the opposite direction.

Figure 23:
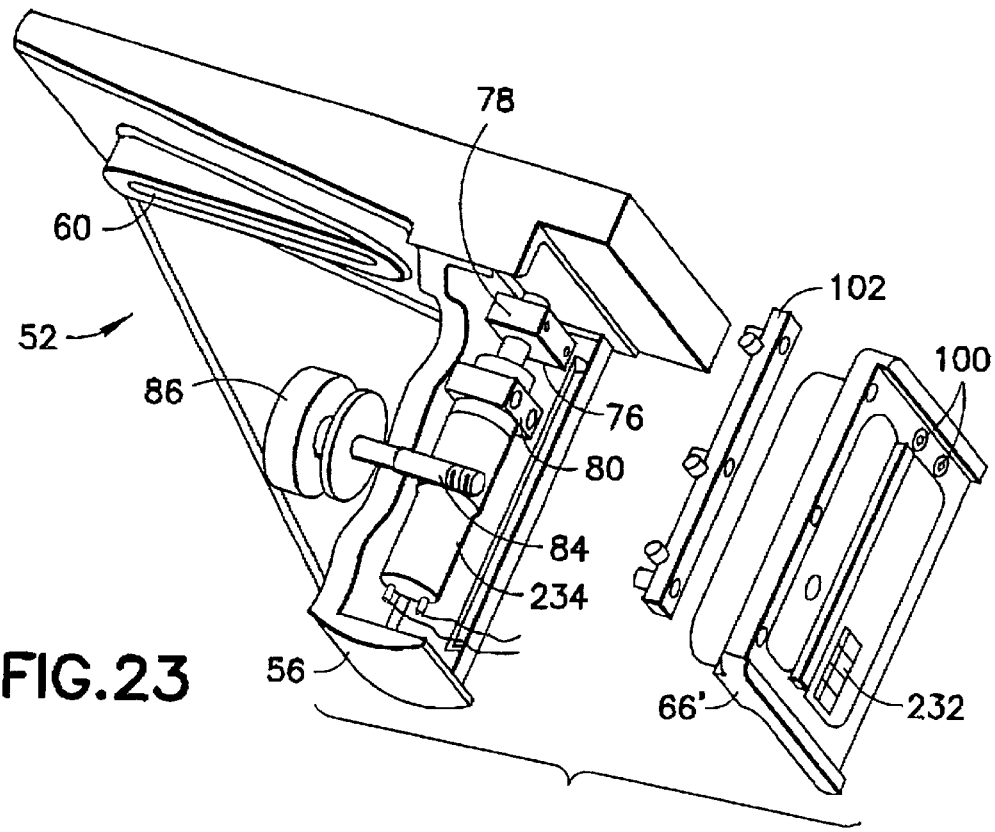
FIG. 23 shows a variant on FIG. 16 in order to illustrate the adjustable, right-hand holding member with electrically activated adjustment mechanism.
Figure 24:
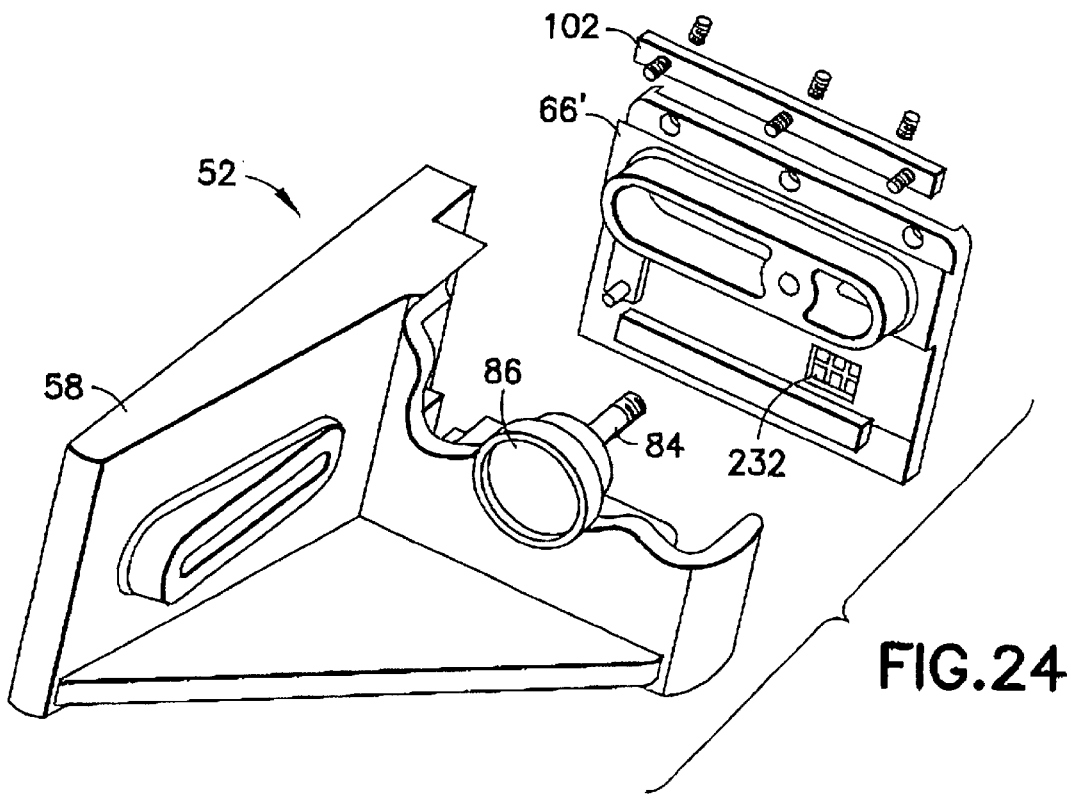
FIG. 24 shows the view of the holding member of FIG. 23 from a different viewing angle.

FIGS. 23 and 24 show that in this exemplary embodiment the horizontal adjustment of the right-hand holding member 52 relative to the protective hood 10 is also carried out with the aid of an electric motor 234 which takes over the role of the threaded spindle 76 illustrated in FIG. 16. The motor 234 is fitted into the side limb 56, which is designed as a box-like housing, of the right-hand holding member 52 and drives the threaded spindle 76 on which the adjustment nut 78 is positioned. Since this nut is attached to the movable longitudinal wall 66' with the aid of the screws 100, horizontal adjustment of the right-hand holding member 52 relative to the protective hood 10 is achieved by actuation of the motor 234. In this case too, the motor 234 can be actuated via the keyboard 176 and one of the circuit boards 230.

Figure 27:
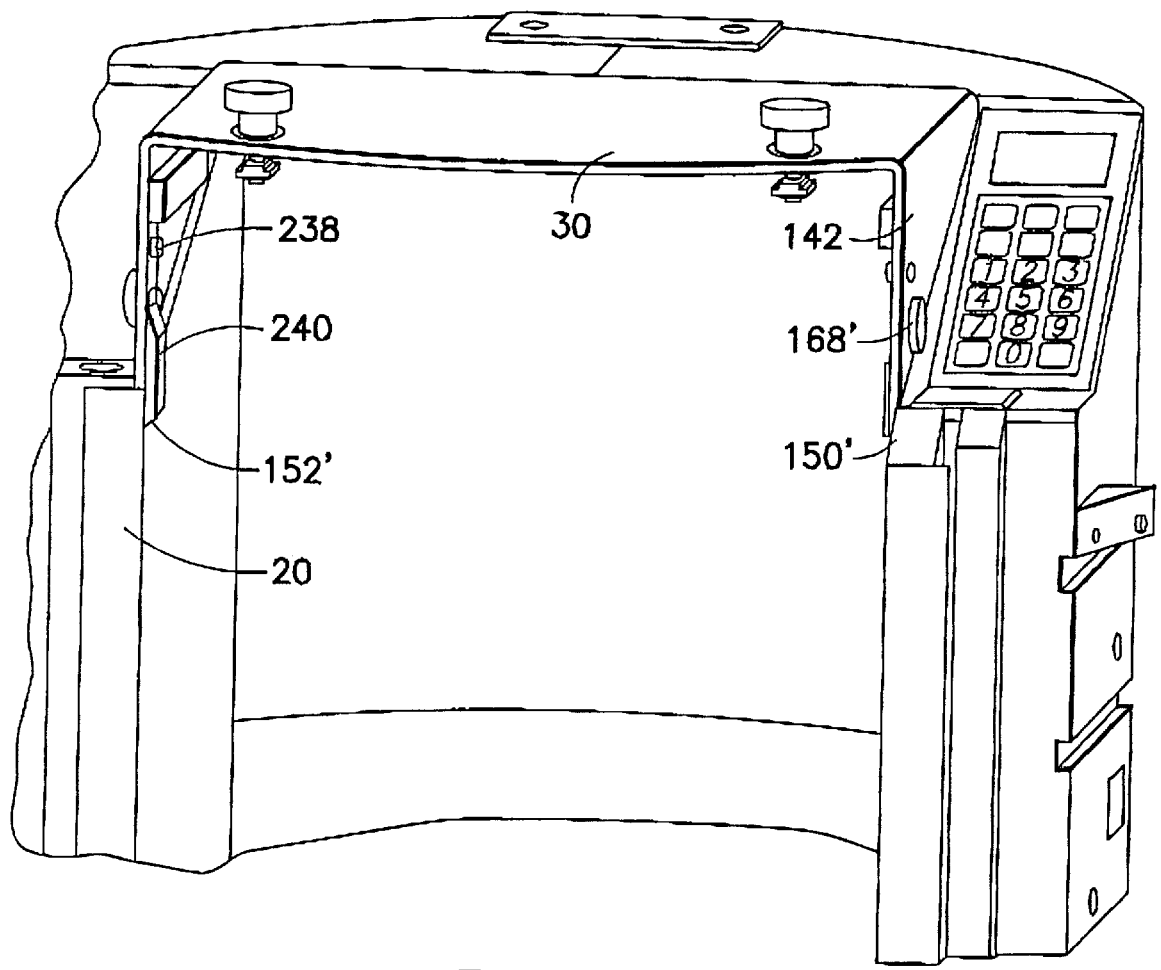
FIG. 27 shows a variant on FIG. 12.

FIG. 27 shows a variant on FIG. 12, for locking the cover flap 30 in its closed position. In this case, a leaf spring 240 is attached to the two rigid side walls 142 by means of a screw 238, which leaf spring, at its free end, forms a protrusion 150' which, when the cover flap 30 is closed, latches into a cutout 152' in the side wall 20. To open the cover flap, the two heads 168' which are attached to the leaf springs 240 are pressed inward from the outside, so that the protrusions 150' are disengaged from the cutouts 152'.

Finally, FIG. 18 shows that the space which is available in the side limb 56 of the left-hand holding member 52 is used to accommodate the approach strip 176 when it is not needed on the protective hood 10.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

What is claimed is:

1. A protective hood for a wood-milling machine, for covering a spindle which projects vertically out of a horizontal machine table and bears a milling tool, comprising:
    two side walls;
    a cover and a rear wall connecting said side walls, and
    a front protective shield;
    the protective hood being adjustably attached to the machine table and including, devices for attaching working and guide members, wherein a holding member for the movable attachment of a stop plate is arranged on each of the two side walls, said holding member comprising a side limb, which is releaseably attached to the side wall, and a front limb, which is at right angles to the side limb and bears the stop plate, said hood having an exhaust opening in an upper region thereof.

2. The protective hood of claim 1, wherein the front limb has a horizontal slot for the horizontally adjustable fixing of the stop plate.

3. The protective hood of claim 1, wherein the side limb is horizontally adjustable relative to the side wall of the protective hood, the two side walls of which are horizontally displaceable on parallel guide rails which are attached to the machine table.

4. The protective hood of claim 3, wherein each of the two side walls is fixed to the guide rail by a clamping member.

5. The protective hood of claim 4, wherein the clamping member is a vertically oriented clamping screw.

6. The protective hood of claim 4, wherein the clamping member is a vertical spindle which is driven by a motor.

7. The protective hood of claim 3 further comprising an adjustment mechanism which is accommodated in the side limbs for the horizontal adjustment of the protective hood and/or the holding members.

8. The protective hood of claim 7, wherein each adjustment mechanism has a threaded spindle with an adjustment nut and extends parallel to the associated side wall or to the associated side limb.

9. The protective hood of claim 7, wherein each side limb comprises a box-like housing with two parallel longitudinal walls, in which housing the adjustment mechanism is arranged, the threaded spindle of which is connected to an adjustment spindle by an angular gear.

10. The protective hood of claim 9, wherein the adjustment spindle is arranged in the region of the front limb of the holding member.

11. The protective hood of claim 9, wherein for horizontal adjustment of the protective hood, the box-like housing of one of the two side limbs is attached to the associated side wall of the protective hood by a through-bolt, and wherein a mandrel of the adjustment nut engages through an opening in the opposite side wall of the protective hood, into a bore in the associated guide rail.

12. The protective hood of claim 7, wherein the adjustment mechanism is fitted into each of the two side walls of the protective hood, the threaded spindle of which mechanism is driven by a motor, preferably an electric motor, and the adjustment nut of which mechanism is in fixed engagement with the associated guide rail.

13. The protective hood of claim 12, wherein the motor is connected to the threaded spindle by a belt drive.

14. The protective hood of claim 12, wherein each adjustment mechanism comprises a unit which can be inserted into the side wall and has two inner walls, on which, for sliding guidance on the guide rail, two strips are arranged, which lie parallel opposite one another and have an adjustable distance therebetween.

15. The protective hood of claim 14, wherein the adjustment mechanism with motor and electronic circuit board are attached to one of the two inner walls.

16. The protective hood of claim 12, wherein an extension, which projects downwards from the adjustment nut, engages in an opening in the guide rail, in which it is attached by means of a threaded bolt which is accessible from the outside.

17. The protective hood of claim 12, wherein the threaded spindle can be turned manually and has a head for tool engagement.

18. The protective hood of claim 6, wherein the vertical spindle has a bottom threaded end, engages in the threaded bore of the adjustment nut onto which a slide is fitted, which slide is attached to the motor and the cross-section of which slide is in the form of an upside-down U, the vertical limbs of which are supported on the top side of the two strips.

19. The protective hood of claim 8, wherein for horizontal adjustment of one of the two holding members, the side limb of which is designed as a box-like housing, the two longitudinal walls of the housing are displaceable relative to one another, one longitudinal wall being attached to the associated side wall of the protective hood and to the adjustment nut.

20. The protective hood of claim 19, wherein the longitudinal wall which is attached to the protective hood by means of a through-bolt is mounted displaceably on a guide strip arranged in the box-like housing.

21. The protective hood of claim 19, wherein the threaded spindle is manually rotatable by an adjustment spindle.

22. The protective hood of claim 19, wherein the threaded spindle is connected to a drive motor.

23. The protective hood of claim 19, wherein the longitudinal walls and the opposite side walls of the protective hood have electrical contact elements.

24. The protective hood claim 23, wherein a keyboard for inputting control parameters is arranged on the protective hood.

25. The protective hood of claim 9, wherein a measurement scale with a visual display is assigned to at least one adjustment spindle.

26. The protective hood of claim 1, wherein the cover comprises a fixed support surface which is connected to the rear wall and on which a cover flap is articulatedly mounted via a hinge, wherein the flap bears a pull-out extension plate with a downwardly projecting rim on the front side of which the protective shield is arranged in a vertically adjustable manner.

27. The protective hood of claim 26, wherein the front side of the rim merges into two side plates which are guided between two side walls which project from the cover flap.

28. The protective hood of claim 27, wherein the two side walls of the cover flap are in the shape of a triangle converging toward the hinges, and wherein the adjoining side walls of the protective hood are beveled accordingly.

29. The protective hood of claim 26 further comprising a latching element whereby the cover flap can be fixed in an upwardly open position.

30. The protective hood of claim 26, wherein the cover flap, in the horizontal, closed position, latches elastically into an undercut in the side wall of the protective hood by means of a protrusion.

31. The protective hood of claim 26, wherein the sidewall has a cut out and the cover flap, in the horizontal closed position, latches elastically into the cutout by a spring element.

32. The protective hood of claim 26, wherein the support surface has means for attaching a bearing block for a pivot arm of a protection and pressure device.

33. The protective hood of claim 1, wherein each of the side walls has a vertical holding bore for receiving a bearing element for a pressure or guide member.

34. The protective hood of claim 1, wherein a vertical groove for receiving an auxiliary tool, in particular an approach strip, in a vertically adjustable manner, is machined into a region of the front edge of at least one side wall which faces laterally outwards.

35. The protective hood of claim 1 further comprising a dust-protective curtain adjustably attached to the side wall through a horizontal threaded bore.

36. The protective hood claim 35, wherein the dust-protective curtains, which are arranged on both sides, are attached in such a way that they converge toward one another at an angle.

* * * * *